(12) United States Patent
Väth

(10) Patent No.: US 8,329,808 B2
(45) Date of Patent: Dec. 11, 2012

(54) METHOD FOR COMPOUNDING A PLASTIC MATERIAL, PLASTIC MATERIAL AND PLASTIC PRODUCT

(75) Inventor: Norbert Väth, Esselbach (DE)

(73) Assignee: Takata AG, Aschaffenburg (DE)

( * ) Notice: Subject to any disclaimer, the term of this patent is extended or adjusted under 35 U.S.C. 154(b) by 152 days.

(21) Appl. No.: 12/805,429

(22) Filed: Jul. 30, 2010

(65) Prior Publication Data

US 2010/0305265 A1    Dec. 2, 2010

Related U.S. Application Data

(63) Continuation of application No. PCT/EP2009/058599, filed on Jul. 7, 2009.

(30) Foreign Application Priority Data

Jul. 11, 2008 (DE) .................. 10 2008 033 290

(51) Int. Cl.
   C08K 5/00 (2006.01)
   C08L 23/26 (2006.01)
(52) U.S. Cl. ....................... 524/515; 524/581
(58) Field of Classification Search .................. 524/515
   See application file for complete search history.

(56) References Cited

U.S. PATENT DOCUMENTS

| | | | |
|---|---|---|---|
| 5,994,471 A | 11/1999 | Seelert et al. | |
| 6,063,867 A | 5/2000 | Wang et al. | |
| 6,207,754 B1 | 3/2001 | Yu | |
| 2004/0236032 A1 | 11/2004 | Bacci et al. | |
| 2005/0075457 A1* | 4/2005 | Koschmieder et al. | 525/191 |
| 2007/0077375 A1* | 4/2007 | Honda et al. | 428/31 |
| 2008/0150261 A1* | 6/2008 | Von Tschammer et al. | 280/728.3 |

FOREIGN PATENT DOCUMENTS

| | | |
|---|---|---|
| DE | 33 10 294 C1 | 8/1984 |
| DE | 42 03 542 A1 | 8/1993 |
| DE | 10 2006 033 897 A1 | 1/2008 |
| EP | 0 554 843 A1 | 2/1993 |
| EP | 0 872 517 A1 | 10/1998 |
| JP | 58-002340 | 1/1983 |
| JP | 58002340 A * | 1/1983 |
| JP | 61-023634 | 2/1986 |
| JP | 10-045956 | 2/1998 |
| JP | 10-158340 | 6/1998 |
| JP | 2004-075993 | 3/2004 |
| WO | WO 98/54260 A1 | 12/1998 |
| WO | WO 02/102880 A1 | 12/2002 |
| WO | WO 2006/070179 A1 | 7/2006 |
| WO | WO 2008/009432 A1 | 1/2008 |

OTHER PUBLICATIONS

Office Action—Reasons of Rejection—in JP Appln No: 2010-549161 dated Feb. 3, 2011.*
Japanese Decision in JP Appln No: 2010-549161 dated Feb. 13, 2012.

* cited by examiner

*Primary Examiner* — Hui Chin
(74) *Attorney, Agent, or Firm* — Foley & Lardner LLP

(57) ABSTRACT

A method for compounding a plastic material is provided, wherein the following steps are carried out: a) providing at least one ethylenic polymer; b) addition of at least one cross-linking agent to the ethylenic polymer; c) at least partial cross-linking of the ethylenic polymer by the cross-linking agent; d) addition of at least one propylenic polymer to the product obtained in step c); and e) at least partial cross-linking of the propylenic polymer with the product obtained in step c). Further, a plastic material producible by this method, and a plastic product made out of it are provided.

14 Claims, 1 Drawing Sheet

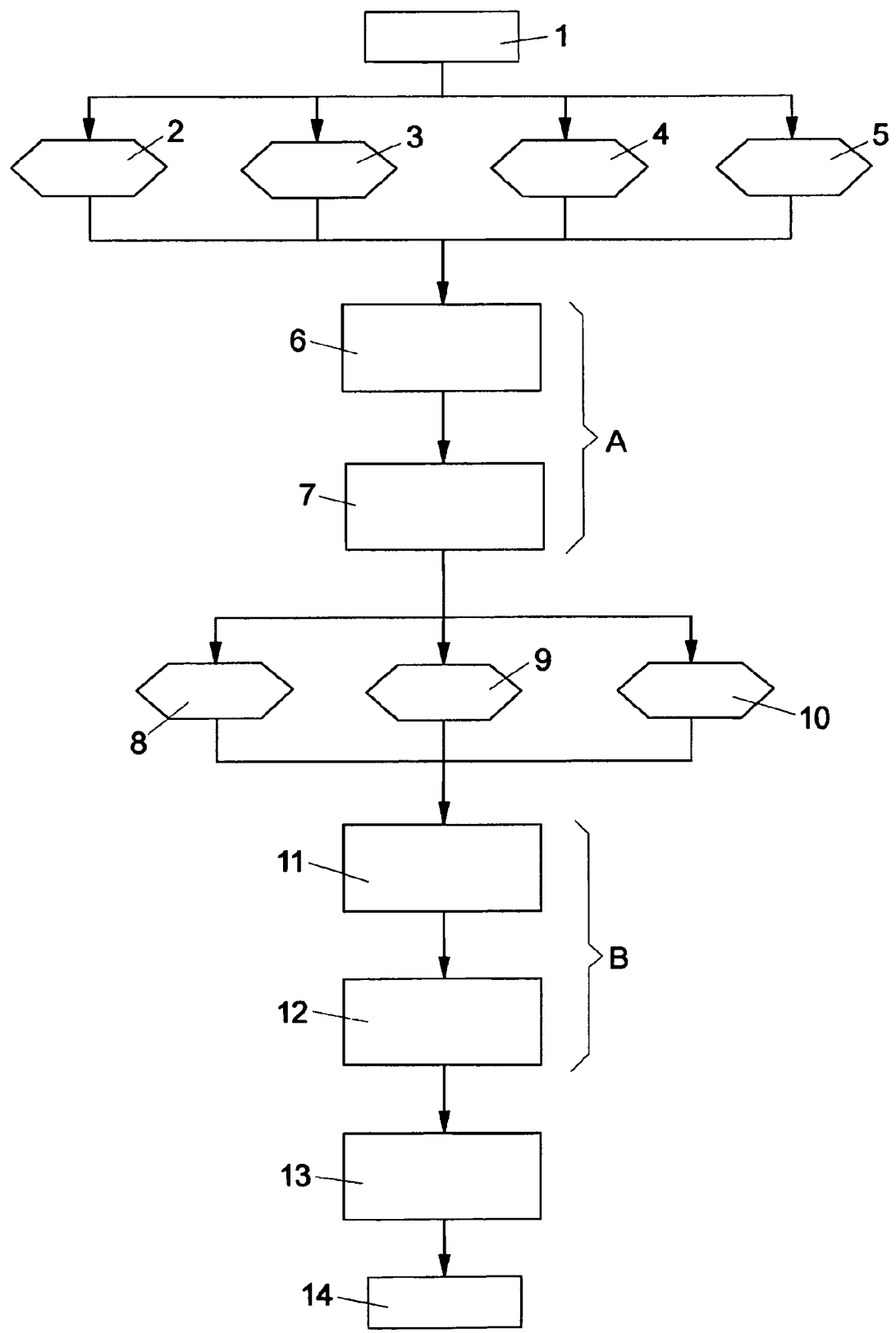

METHOD FOR COMPOUNDING A PLASTIC MATERIAL, PLASTIC MATERIAL AND PLASTIC PRODUCT

CROSS-REFERENCE TO RELATED PATENT APPLICATIONS

This application is a Continuation of International Application PCT/EP2009/058599, filed Jul. 7, 2009, which was published in German on Jan. 14, 2010 as WO 2010/003950 A1. The foregoing International Application is incorporated herein by reference in its entirety.

BACKGROUND

The claimed invention relates to a method for compounding a plastic material, to a plastic material, and to a plastic product which is made from this plastic material.

From DE 10 2006 033 897 A1 a thermoplastic elastomer is known which consists of a propylene copolymer of propylene and at least a further alkene, an ethylene copolymer of ethylene and at least a further alkene, an ethylene-propylene-diene rubber and a filler material for the modification of surface-forming properties of the thermoplastic elastomer. Thereby, all ingredients are mixed with a cross-linking agent and are conjointly cross-linked with each other for producing this thermoplastic elastomer.

Also from WO 2006/070179 A1 a thermoplastic elastomer is known which is made from a propylenic olefin polymer, an ethylenic polymer, a cross-linking agent, a generator of free radicals and optionally a high density polyethylene. Thereby, once again all ingredients are mixed with each other and are cross-linked with each other.

The physical properties of plastics strongly depend on the temperature. Thus, these properties at low temperatures, i.e. at temperatures below -30 C°, in particular below -32.5 C°, below -35 C.° and very particularly at temperatures of -37.5 C.° or below, cannot be compared with those at room temperature or even higher temperatures. Additionally, no stringent conclusions can be drawn from the physical properties which are measured by default at high temperatures as, e.g., 140 C.° or 230 C.° to the properties of the plastics at low temnperatures.

The properties of a plastic at low temperatures have, e.g., a pivotal influence onto the usability of the plastic if it shall be used as material for a covering or a housing of an airbag for a motor vehicle. Thereby, it has to be guaranteed that a plastic used in such a way shows a reproducible rupture behavior also at low temperatures and that the formation of loose plastic particles is avoided at the same time.

The behavior of the plastic which is shown when it ruptures along a predetermined breaking point, e.g., by the deployment of an airbag (airbag activation) due to an accident shall here—in case of using a plastic for the production of a covering of an airbag—be understood as rupture behavior. Such rupture behavior can also be transferred onto other plastic products and other events initiating the rupture.

It was shown that airbag coverings or airbag housings which are made from various conventional materials like, e.g., thermoplastic elastomers based on olefins (TPO) or based on olefins, cross-linked rubber and styrol-ethene-butene-styrol (TPO/SEBS/TPV) still show a desirable rupture behavior at −32.5 C°, however, no longer at −35 C.° or −37.5 C°. An undesirable rupture behavior can, e.g., be manifested in that airbag coverings or housings do not any longer rupture along a predetermined breaking point, but rip uncontrolled and further parts of the material detach from the airbag covering during rupture or ripping (e.g., due to an airbag activation).

But also in case of materials known from prior art which guarantee a desirable rupture at low temperature, the problem occurs that their production can often not be effected in a reproducible way and is laborious.

SUMMARY

It is an object of the instant invention to provide a method which allows the reproducible production of a plastic material in a simple manner, the plastic material being suited for the usage as an airbag covering and showing also at low temperatures a suited rupture behavior. The invention is further based on the object to provide a plastic material.

This object is solved by a method for compounding a plastic material having the following steps (in the indicated order): a) providing at least one ethylenic polymer, b) addition of at least one cross-linking agent to the ethylenic polymer, c) at least partially cross-linking the ethylenic polymer by the cross-linking agent, d) addition of at least one propylenic polymer to the product obtained in step c), and e) at least partially cross-linking the propylenic polymer with the product obtained in step c).

I.e., in this method, initially a cross-linking of an ethylenic polymer is carried out and subsequently a cross-linking of a propylenic polymer with the already pre-cross-linked ethylenic polymer. Thereby, particularly suited properties of the compounded plastic with respect to the rupture properties of an airbag covering being made of this plastic are achieved. In other words, due to a two-step cross-linking reaction, initially a basic cross-linking of the ethylenic polymer is carried out (first cross-linking step) and subsequently the degree of cross-linking is trimmed or adjusted by cross-linking with a propylenic polymer (second cross-linking step).

The term of compounding is well known to a person skilled in the art working in the field of plastic technique and describes an improvement process of plastics by adding aggregates for a targeted optimization of the property profiles of the plastics. Aggregates within the meaning of an aspect of the invention are, e.g., additives, modification agents (modifier) and other plastics. In the simplest case, an ethylenic polymer is presently improved with a propylenic polymer.

E.g., 30 to 50%, particularly 35 to 45% and very particularly 37 to 40% of the ethylenic polymer can be used in the method. These percentage values are to be understood here and in the following always as mass percent unless otherwise arising from the context (e.g., by the usage of percent as measuring unit for the elongation at break or strain at break) or unless anything else is explicitly indicated. The percentage values of the compounds to be used further relate to the total amount of the different substances used for compounding in each case.

Additionally, e.g., 49 to 69%, in particular 54 to 64% and very particularly 56 to 59% of the propylenic polymer can be used in the method.

In a variant of the method, an ethylene-propylene-diene rubber (EPDM) and/or a copolymer of ethene and a further alkene is used as ethylenic polymer. If the further alkene is propene, the propylenic polymer must have a chemical structure differing from the ethylenic polymer. I.e., the ethylenic polymer and the propylenic polymer must not be the same substances. Octene is particularly suited as further alkene. Amongst others, 1,4-hexadiene, norbonene, dicyclopentadiene or a mixture thereof can be considered as diene component of the EPDM according to an embodiment. Other diene components are also thinkable since they influence the principle properties of the plastic, the component of which the EPDM is, only marginally.

In an alternative embodiment, a copolymer of propene and a further alkene is used as propylenic polymer. The further alkene can generally also then be an ethene if a copolymer of ethene and propene is used as ethylenic polymer. However, in this case, distinct ratios of the propene component and the ethene component to each other are to be provided in each case in the ethylenic polymer and in the propylenic polymer. Thereby, the ethylenic polymer would in this case contain a high amount of ethene units and a lower amount of propene units, whereas this ratio would be vice versa in case of the propylenic polymer.

A suited propylenic polymer is, e.g., a polypropylene having a melt flow index of approximately 15 g/10 min (measured at 230° C. and a mass of 2.16 kg according to ISO 1133), a tensile strength at break of 24 MPa (measured according to ISO 527-2), an elongation at yield of 6% (measured according to ISO 527-2), a tensile modulus of 1050 MPa (measured according to ISO 527-2), an elasticity modulus of 950 MPa (measured according to ISO 178), an impact strength of more than 50 at 23° C. and of 8 at −20° C. (measured according to ISO 180 in each case), a Rockwell hardness of 78 on the R scale (measured according to ISO 2039-2), a melting pint of 165 ° C. (measured according to ISO 3146), a density of 0.905 g/cm$^3$ and a bulk density of 0.525 g/cm$^3$ (measured according to ISO 1183 in each case). Other polypropylenes with similar properties are also suited.

In a further variant, the cross-linking agent comprises a peroxide as cross-linker. A peroxide-catalyzed cross-linking reaction is known to the person skilled in the art and will here not be described in detail. By using a peroxide as cross-linker, the further effect results that the propylenic polymer is at least partially decomposed (degraded) by the peroxide prior to a cross-linking. Thereby, the molecular weight of the used propylenic polymer is reduced prior to a cross-linking so that particular suited properties of the compounded plastic material result.

In a variant of the method, e.g., 0.1 to 0.3%, particularly 0.1 to 0.2% cross-linking agent can be used. Thereby, the cross-linking agent contains in a variant 100% of a peroxidic cross-linker which contains approximately 8 to 12%, particularly approximately 9 to 10%, active peroxide.

In an alternative embodiment, the peroxide is embedded in a polypropylene base resin. Thereby, a particularly good admixture into the components to be cross-linked can be achieved.

In a further variant, the cross-linking agent contains also an accelerator besides the actual cross-linker, which accelerator accelerates the release of the reactive species out of the cross-linker and thus serves for a faster polymerization or cross-linking. The mass ratio of cross-linker to accelerator can thereby be, e.g., between 1:1 and 4:1. I.e., the accelerator can, e.g., have a mass proportion of 0.05% of the total mixture and the cross-linker 0.2%. Alternatively, the accelerator can also have a proportion of 0.05, 0.1 or 0.15% and the cross-linker can have a proportion of 0.05, 0.1, 0.15, 0.2 or 0.25% (in particular within the above-indicated ratios).

In an embodiment, the accelerator comprises a triallyl cyanurate. E.g., an accelerator can be used which contains 70% triallyl cyanurate.

In a variant of the method, at least one additive is added to the plastic material to be compounded in step b) and/or d), the additive being chosen from the group comprising antistatic agents, antioxidants, polyethylene masterbatches and filler materials. Generally, also other additives like, e.g., flame retardants can be used. For achieving suited properties of an airbag covering made from the plastic to be compounded with respect to a particular favorable rupture behavior at low temperatures such filler materials are, however, not necessary.

Examples for suited and antistatic agents are glycerol monostearate, ethoxylated amines and alkane sulfonates.

Examples for suited antioxidants are phenolic antioxidant agents generally known to the person skilled in the art, in particular hindered phenol derivates which are distributed under the trade name Irganox.

The addition of an antioxidant or an antioxidant agent into the plastic material to be compounded does primarily not play an essential role for the surface condition and the rupture behavior at low temperatures of an airbag covering which is made from the plastic. However, by the addition of an antioxidant agent, aging processes of the plastic are significantly slowed down so that an airbag covering, which is made from the plastic, has constantly remaining properties also over a period of several years.

An example for a suited polyethylene masterbatch is a masterbatch containing a black dye serving for a suited complete dying of the plastic material to be compounded and products produced out of it.

Examples for filler materials are carbonates, talc, carbon black, glass fibers, wollastonite or a mixture of these substances. Suited glass fibers are, e.g., long glass fibers having a length of 2 cm. In particular calcium carbonate can be used as carbonate but also the carbonates of other earth alkali metals, alkali metals or metals are in principle suited as filler materials.

The filler material modifies surface-forming properties of a plastic in such a way that products being produced out of the plastic have surfaces which have desirable properties like, e.g., a high smoothness or a good concealment of sink marks.

It is, however, not necessary to add a filler to the plastic to be compounded. Due to the claimed method, products consisting of an accordingly produced plastic have already without filler materials a surface having suited properties. This significantly simplifies the production of according plastics.

In a further variant, the method is carried out in such a way that the cross-linking agent is once again added to the plastic material to be compounded in step d) or between step d) and step e). Thereby, the same cross-linking agent can be used that has already been used in step b) (with or without accelerator). Alternatively, another cross-linking agent (with or without accelerator) can be added. The amount of the cross-linking agents being once again added can be smaller than, equal to or bigger than that amount having been added in step b). However, it is not generally necessary to add a new cross-linking agent. Rather, the amount of the cross-linking agent having been added in step b) can already be measured such that it is sufficient for the cross-linking of the ethylenic polymer as well as for the subsequent cross-linking of the propylenic polymer.

In a variant, the method is carried out in an extrusion device. This makes it possible in a particular simple manner to adjust different temperatures which are suited for the support and/or the execution and/or the triggering of the cross-linking. Additionally, the different substances to be cross-linked can be mixed in an extrusion device in a particular simple manner.

The object underlying the invention is also solved by a plastic material which can be produced, in particular is produced, by a method according to the preceding explanations, wherein for the production approximately 37 to 40% of at least one ethylenic polymer, approximately 56 to 59% of at least one propylenic polymer, approximately 0.1 to 0.3% of the cross-linking agent and approximately 0.7 to 6.9% of at least one additive are used. It is obvious for a person skilled in the art that the aforementioned substances are used in such an amount in each case that the sum of the substances used for the production of the plastic material gives 100%. In a variant, no further substances than the aforementioned substances are used for the production of the plastic. In a further variant, no EPDM is used as ethylenic polymer but only a copolymer of ethylene and a further alkene. Thereby, reference is made with respect to alternative embodiments also to the above explanations to the method which are valid for the plastic material in the same manner.

In a variant, the plastic material has an elasticity modulus, measured according to ISO 527, of approximately from 400 to 550 MPa for s suited rupture behavior at high and low temperatures of an airbag covering made from the plastic material.

In a further variant, the plastic material has a tensile strength at break, measured according to ISO 527-1, of from 12.5 to 14.0 MPa.

In an alternative embodiment, the plastic material has a tensile strain at break or an elongation at break, measured according to ISO 527-2, of from 400 to 750%.

In a further embodiment, the plastic material has a Shore D hardness, measured according to ASTM D 2240, of from 40 to 50.

In an alternative, the plastic material has melt flow index at a mass of 5 kg and a temperature of 230° C., measured according to ISO 1133, of 10 to 35 g/10 min.

The aforementioned parameters influence the properties of a product, in particular those of an airbag covering, made from the plastic material in such a way that the product has at low temperatures as well as also at high temperatures suited rupture properties and that the plastic material, consequently, is suited for the production of airbag coverings.

The object is further solved by a plastic product comprising a plastic material according to the above-explained specifications, in particular consisting of such a plastic material. This plastic product can, e.g., be a product which is used in the automotive sector. Thereby, the plastic products can be designed such that it has a predetermined breaking point along which it can rupture if an element lying beneath the plastic product shall be released. E.g., the plastic product can be an airbag casing or an airbag covering.

Further details of an aspect of the invention will be explained in more detail with the help of a Figure and with the help of examples.

BRIEF DESCRIPTION OF THE DRAWINGS

FIG. 1 shows a flow chart of an exemplary embodiment of a method for compounding a plastic material.

DETAILED DESCRIPTION

In FIG. 1, a flow chart of an exemplary embodiment of a method for compounding a plastic material is depicted, the method being carried out in an extruder as extrusion device. For the start 1 of the method, an elastomer 2 as ethylenic polymer is filled together with additives 3, a cross-linker 4 and an accelerating agent 5 into a compounder and mixed therein. The resulting mixture is heated so that a cross-linking of the elastomer 2 results under temperature influence. The cross-linker 4 and the accelerating agent 5 form thereby together a cross-linking agent, the reactivity of which is increased due to the elevated temperature.

The mixing 6 in the compounder as well the subsequent cross-linking 7 of the elastomer form the first cross-linking step A of the method.

Subsequently, a polypropylene 8 as propylenic polymer, additives 9 and a modifier 10 for adjusting the properties of the plastic material to be compounded are put into the mixture containing the cross-linked elastomer 2. After a new mixing 11 in the compounder, cross-linking 12 of the polypropylene 8 under temperature influence takes place. During this cross-linking 12, the polypropylene is cross-linked in itself as well as with the elastomer 2 being already pre-cross-linked in the first cross-linking step A. The anew mixing 11 and the cross-linking 12 of the polypropylene form the second cross-linking step B of the method.

After finishing cross-linking 12 of the polypropylene 8, a granulating 13 of the compounded plastic material takes place and is followed by the end 14 of the method.

Different plastic materials having suited properties in each case can be produced by this method. Some of such plastic materials are described in more detail as exemplary embodiments in the subsequent tables with respect to their constitution and their physical properties. Thereby, the percentage values of table 1 are related in each case to the preparation composition by which the different plastic materials are produced. In the readily produced plastic a slightly deviating composition is present since, e.g., no or only little cross-linker is contained (this cross-linker was chemically degraded during the cross-linking reaction).

The plastic materials of all subsequent examples have been carried out in a co-rotating two-threaded Berstorff screw extruder having a diameter of 92 mm and a length/diameter ratio (L/D) of 36. Thereby, the single heatable zones of this extruder (zone 1 to zone 9) are uniformly distributed over the length of the extruder.

TABLE 1

Composition of the substance mixtures used for the production of the plastic materials of examples 1 to 6. Specifications in mass percent.

| | Example | | | | | |
|---|---|---|---|---|---|---|
| | 1 | 2 | 3 | 4 | 5 | 6 |
| PP copolymer 1 | 17.9 | 17.65 | | 23 | 23 | 23 |
| PP copolymer 2 | 40 | 40 | 57.6 | 34.4 | 34.9 | 34.4 |
| phenolic antioxidant | 0.1 | 0.1 | 0.1 | 0.1 | 0.1 | 0.1 |
| black-colored PE masterbatch | 2 | 2 | 2 | 2 | 2 | 2 |
| release agent 1 | 1.1 | 1.3 | | | | 1 |
| epoxide resin | 0.25 | 0.25 | 0.2 | 0.2 | 0.2 | 0.2 |
| PP homopolymer | | | 0.5 | 0.7 | 0.55 | 0.55 |
| copolymer of ethylene und octene | 38 | 38 | 39 | 39 | 38 | 38 |
| peroxide in PP base resin (active concentration of peroxide: 9-10%) | 0.1 | 0.1 | 0.1 | 0.1 | 0.15 | 0.15 |
| accelerator (70% triallyl cyanurate) | 0.05 | 0.1 | 0.1 | 0.1 | 0.05 | 0.05 |
| PP homopolymer antistatic agent, containing glycerol monostearate | 0.5 | 0.5 | | 0.3 | 0.95 | 0.55 |
| release agent 1 | | | 0.1 | 0.1 | | |
| total | 100 | 100 | 100 | 100 | 100 | 100 |

PP—polypropylene.
PE—polyethylene.

The PP copolymer 1 is a polypropylene having a melt flow index of around 1.3 g/10 min (measured at 230° C. at a mass of 2.16 kg according to ISO 1133), a tensile strength at break of 29 MPa (measured according to ISO 527-2), a yield strain of 6% (measured according to ISO 527-2), a tensile modulus of 1500 MPa (measured according to ISO 527-2), an elasticity modulus of 1400 MPa (measured according to ISO 178), an impact strength of more than 50 at 23° C. and of 9 at −20° C. (measured in each case according to ISO 180), a Rockwell hardness of 82 on the R scale (measured according to ISO 2039-2), a melting point of 165° C. (measured according to ISO 3146), a density of 0.905 g/cm$^3$ and a bulk density of 0.525 g/cm$^3$ (measured in each case according to ISO 1183).

The PP copolymer 2 is a polypropylene having a melt flow index of around 15 g/10 min (measured at 230° C. at a mass of 2.16 kg according to ISO 1133), a tensile strength at break of 24 MPa (measured according to ISO 527-2), a yield strain of 6% (measured according to ISO 527-2), a tensile modulus of 1050 MPa (measured according to ISO 527-2), an elasticity modulus of 950 MPa (measured according to ISO 178), an impact strength of more than 50 at 23° C. and of 8 at −20° C. (measured in each case according to ISO 180), a Rockwell hardness of 78 on the R scale (measured according to ISO 2039-2), a melting point of 165° C. (measured according to ISO 3146), a density of 0.905 g/cm$^3$ and a bulk density of 0.525 g/cm$^3$ (measured in each case according to ISO 1183).

The copolymer of ethylene and octene has a melt flow index of around 10 g/10 min (measured at 190° C. and a mass of 2.16 kg according to ASTM D 1238), a tensile strength at break of 3 MPa (measured according to ASTM D 638), a tensile elongation at break of 1220% (measured according to ASTM D 638), an elasticity modulus of 4.5 MPa (at 1% secant, measured according to ASTM D 638), a Shore D hardness of 11 (measured according to ASTM 2240) and a density of 0.857 g/cm$^3$ (measured according to ASTM D 792).

The release agent 1 is a siloxane-based release agent consisting of 50% active agent on 50% carrier material. The release agent 2 is a non-siloxane-based release agent. Both release agents serve for enabling a good release of the compounded plastic material from the extruder in other surfaces during further processing. They have no substantial influence on the further properties of the plastic material.

The polypropylene homopolymers added in an amount of less than 1% in each case serve as carrier material for a better dosage of additives which are added to the mixture in an amount of less than 2%. Due to the small used amount, they have no substantial influence onto the properties of the plastic material.

Table 2 depicts the process parameters during the plastic compounding.

TABLE 2

Process parameters within the extruder.

| | Example | | | | | |
|---|---|---|---|---|---|---|
| | 1 | 2 | 3 | 4 | 5 | 6 |
| output in kg/h | 900 | 500 | 900 | 900 | 900 | 900 |
| temperature of zone 1 in ° C. | 25 | 25 | 25 | 25 | 25 | 25 |
| temperature of zone 2 in ° C. | 150 | 150 | 150 | 150 | 150 | 150 |
| temperature of zone 3 in ° C. | 200 | 200 | 200 | 200 | 200 | 200 |
| temperature of zone 4 in ° C. | 200 | 200 | 200 | 200 | 200 | 200 |

TABLE 2-continued

Process parameters within the extruder.

| | Example | | | | | |
|---|---|---|---|---|---|---|
| | 1 | 2 | 3 | 4 | 5 | 6 |
| temperature of zone 5 in ° C. | 200 | 200 | 200 | 200 | 200 | 200 |
| temperature of zone 6 in ° C. | 200 | 200 | 200 | 200 | 199 | 199 |
| temperature of zone 7 in ° C. | 200 | 200 | 205 | 200 | 198 | 198 |
| temperature of zone 9 in ° C. | 205 | 205 | 210 | 205 | 202 | 202 |
| temperature screen changer in ° C. | 200 | 200 | 200 | 200 | 195 | 195 |
| temperature perforated plate in ° C. | 280 | 280 | 65 | 280 | 280 | 280 |
| melt pressure screen changer in bar | 74 | 74 | 64 | 74 | 74 | 74 |
| melt pressure perforated plate in bar | 30 | 30 | 380 | 30 | 30 | 30 |
| revolutions per minute | 380 | 380 | 40 | 380 | 379 | 379 |
| moment of torque in % | 60 | 60 | 0.95 | 60 | 40 | 40 |
| pressure in bar | 0.7 | 0.7 | 0.95 | 0.7 | 0.7 | 0.7 |
| melt temperature in ° C. | 217 | 217 | 215 | 217 | 215 | 215 |

The physical properties of the plastic materials as well as results of surface test, lacquering test and rupture tests of products produced out of these plastic materials are depicted in table 3. The plastic materials of examples 1 to 6 are all suited for the production of airbag casings since they have excellent surface and lacquering properties and show at +85° C. as well as −35° C. a very good rupture behavior. This is particularly achieved by the two-step cross-linking of the plastic components.

TABLE 3

Properties of the compounded plastic materials.

| | Example | | | | | |
|---|---|---|---|---|---|---|
| | 1 | 2 | 3 | 4 | 5 | 6 |
| E modulus (tension) in MPa (according to ISO 527) | 494 | 466 | 416 | 527 | 514 | 515 |
| tensile strength in MPa (according to ISO 527-1) | 13.2 | 12.6 | 13.5 | 12.6 | 13.6 | 13.5 |
| elongation at break in % (according to ISO 527-2) | 505 | 495 | 741 | 410 | 487 | 478 |
| Shore D hardness (according to ASTM D 2240) | 47 | 45 | 42 | 44 | 44 | 44 |
| melt flow index (230° C., 5.0 kg, according to ISO | 16 | 13 | 30 | 17 | 18 | 17 |
| density in g/cm$^3$ (according to ISO 1183-1-A) | 0.9 | 0.9 | 0.9 | 0.9 | 0.88 | 0.88 |
| lacquering | OK | OK | OK | OK | OK | OK |
| surface | OK | OK | OK | OK | OK | OK |
| rupture behavior at −35° C. | OK | OK | OK | OK | OK | OK |
| rupture behavior at +85° C. | OK | OK | OK | OK | OK | OK |

The priority application, German Patent Application DE 10 2008 033 290.9, filed Jul. 11, 2008, including the specification, drawings, claims and abstract, is incorporated herein by reference in its entirety.

What is claimed is:

1. A method for compounding a plastic material, wherein the following steps are carried out:

a) providing a single ethylenic polymer chosen from a group consisting of ethylene-propylene-diene rubbers and copolymers of ethene and a further alkene,
b) adding at least one cross-linking agent to the ethylenic polymer,
c) at least partial cross-linking the ethylenic polymer by the cross-linking agent to obtain a product,
d) adding at least one propylenic polymer to the product obtained in step c), and
e) at least partial cross-linking of the propylenic polymer with the product obtained in step c).

2. The method according to claim 1, wherein a copolymer of propene and a further alkene is used as propylenic polymer.

3. The method according to claim 1, wherein the cross-linking agent comprises a peroxide.

4. The method according to claim 3, wherein the peroxide is embedded in a polypropylene base resin.

5. The method according to claim 1, wherein the cross-linking agent comprises an accelerator which serves for an accelerated release of a species reactive for polymerization from the cross-linking agent.

6. The method according to claim 1, wherein at least one additive is added to the plastic material to be compounded in step b), step d), or a combination thereof, the additive being selected from the group consisting of antistatic agents, antioxidants, polyethylene masterbatches and filler materials.

7. The method according to claim 1, wherein a cross-linking agent is once again added to the plastic material to be compounded in step d) or in an additional step between step d) and step e).

8. The method according to claim 1, wherein the method produces the plastic material having:
a proportion of from 37 to 40% by mass of the single ethylenic polymer,
a proportion of from 56 to 59% by mass of the at least one propylenic polymer,
a proportion of from 0.1 to 0.3% by mass of the cross-linking agent, and
a proportion of from 0.7 to 6.9% by mass of at least one additive.

9. The method according to claim 8, wherein the plastic material has an elasticity modulus, measured according to ISO 527, of from 400 to 550 MPa.

10. The method according to claim 8, wherein the plastic material has a tensile stress at break, measured according to ISO 527-1, of from 12.5 to 14.0 MPa.

11. The method according to claim 8, wherein the plastic material has a tensile strain at break, measured according to ISO 527-2, of from 400 to 750%.

12. The method according to claim 8, wherein the plastic material has a Shore D hardness, measured according to ASTM D 2240, of from 40 to 50.

13. The method according to claim 8, wherein the plastic material has a melt flow index at a mass of 5 kg and a temperature of 230° C., measured according to IS01133, of from 10 to 35 g/10 min.

14. The method according to claim 8, further comprising the step of producing a plastic product from the plastic material.

* * * * *